(12) United States Patent
Sweeney (10) Patent No.: US 10,798,884 B1
(45) Date of Patent: Oct. 13, 2020

(54) LAWN DEBRIS COLLECTION DEVICE (71) Applicant: Joseph Sweeney, Sarasota, FL (US)

(72) Inventor: Joseph Sweeney, Sarasota, FL (US)

( * ) Notice: Subject to any disclaimer, the term of this patent is extended or adjusted under 35 U.S.C. 154(b) by 8 days.

(21) Appl. No.: 16/398,458

(22) Filed: Apr. 30, 2019

(51) Int. Cl.
A01G 20/43 (2018.01)
B65F 1/14 (2006.01)
B65B 67/12 (2006.01)

(52) U.S. Cl.
CPC .......... A01G 20/43 (2018.02); B65B 67/1205 (2013.01); B65B 67/1238 (2013.01); B65F 1/1415 (2013.01); B65F 2240/138 (2013.01)

(58) Field of Classification Search
CPC ............. B65F 1/1415; B65F 2240/138; B65B 67/1238; B65B 67/1205; A01G 20/43
See application file for complete search history.

(56) References Cited

U.S. PATENT DOCUMENTS

| D236,938 | S | | 7/1975 | Bowen | |
|---|---|---|---|---|---|
| 5,031,277 | A | | 7/1991 | Coker | |
| 5,107,666 | A | * | 4/1992 | Rahtican | B65B 67/1238 141/316 |
| 5,393,022 | A | | 2/1995 | Palumbo | |
| 5,593,117 | A | * | 1/1997 | Alexander, III | B65B 67/04 248/95 |
| 7,490,787 | B1 | | 2/2009 | Salazar | |
| 7,815,153 | B2 | | 10/2010 | Campbell | |
| 8,882,350 | B2 | | 11/2014 | Cheney | |
| 8,959,704 | B1 | | 2/2015 | Pena | |
| 9,409,666 | B1 | | 8/2016 | Staten | |
| 10,029,849 | B1 | * | 7/2018 | Genotti, III | B65F 1/10 |
| 2005/0199767 | A1 | * | 9/2005 | Gilbert | B65F 1/1415 248/97 |
| 2008/0052869 | A1 | * | 3/2008 | Fanning | A01G 20/47 15/347 |
| 2012/0325984 | A1 | * | 12/2012 | Moynihan | B65B 67/1233 248/98 |
| 2013/0320159 | A1 | * | 12/2013 | Clark | B65F 1/10 248/99 |
| 2018/0009559 | A1 | * | 1/2018 | Richison | B65F 1/1415 |

FOREIGN PATENT DOCUMENTS

WO 2007044777 4/2007

* cited by examiner

Primary Examiner — Eret C McNichols (57) ABSTRACT

The lawn debris collection device is configured for use in the collection of debris. The lawn debris collection device is configured for use with a trash bag. The lawn debris collection device holds the trash bag in an open position during the collection of debris. The debris is moved to the upwind side of the lawn debris collection device where the debris remains trapped until the debris is placed in the trash bag. The lawn debris collection device folds flat when not in use. The lawn debris collection device comprises a first side support, a second side support, a center support, and an elevated ring structure. The center support and the elevated ring structure attach the first side support to the second side support. Both the center support and the elevated ring structure are configured to hold a trash bag in the open position.

13 Claims, 7 Drawing Sheets

LAWN DEBRIS COLLECTION DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations including packing and storing material including devices that facilitate manual packing operations, more specifically, a frame for holding a sack in an open position. (B65B67/1205)

SUMMARY OF INVENTION

The lawn debris collection device is configured for use in the collection of debris from the ground. The lawn debris collection device is a screened structure that forms a barrier that captures debris as it is blown by the wind. The lawn debris collection device is configured for use with a trash bag. The lawn debris collection device holds the trash bag in an open position during the collection of the debris. Specifically, the debris is moved to the upwind side of the lawn debris collection device where the debris remains trapped until the debris is placed in the trash bag. The lawn debris collection device folds flat when not in use. The lawn debris collection device comprises a first side support, a second side support, a center support, and an elevated ring structure. The center support and the elevated ring structure attach the first side support to the second side support. Both the center support and the elevated ring structure are configured to hold a trash bag in the open position.

These together with additional objects, features and advantages of the lawn debris collection device will be readily apparent to those of ordinary skill in the art upon reading the following detailed description of the presently preferred, but nonetheless illustrative, embodiments when taken in conjunction with the accompanying drawings.

In this respect, before explaining the current embodiments of the lawn debris collection device in detail, it is to be understood that the lawn debris collection device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lawn debris collection device.

It is therefore important that the claims be regarded as including such equivalent construction insofar as they do not depart from the spirit and scope of the lawn debris collection device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
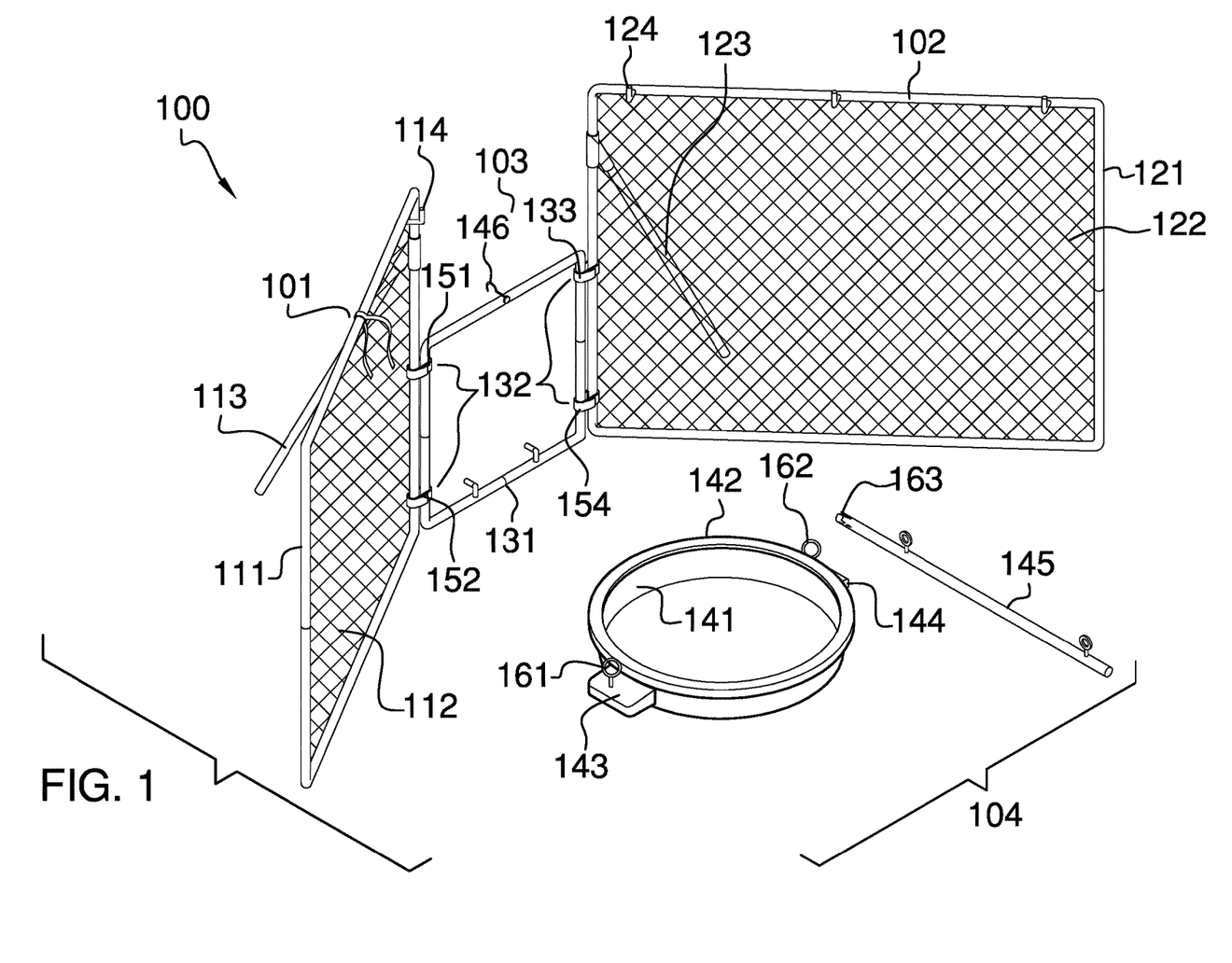
FIG. 1 is a perspective view of an embodiment of the disclosure.
Figure 2:
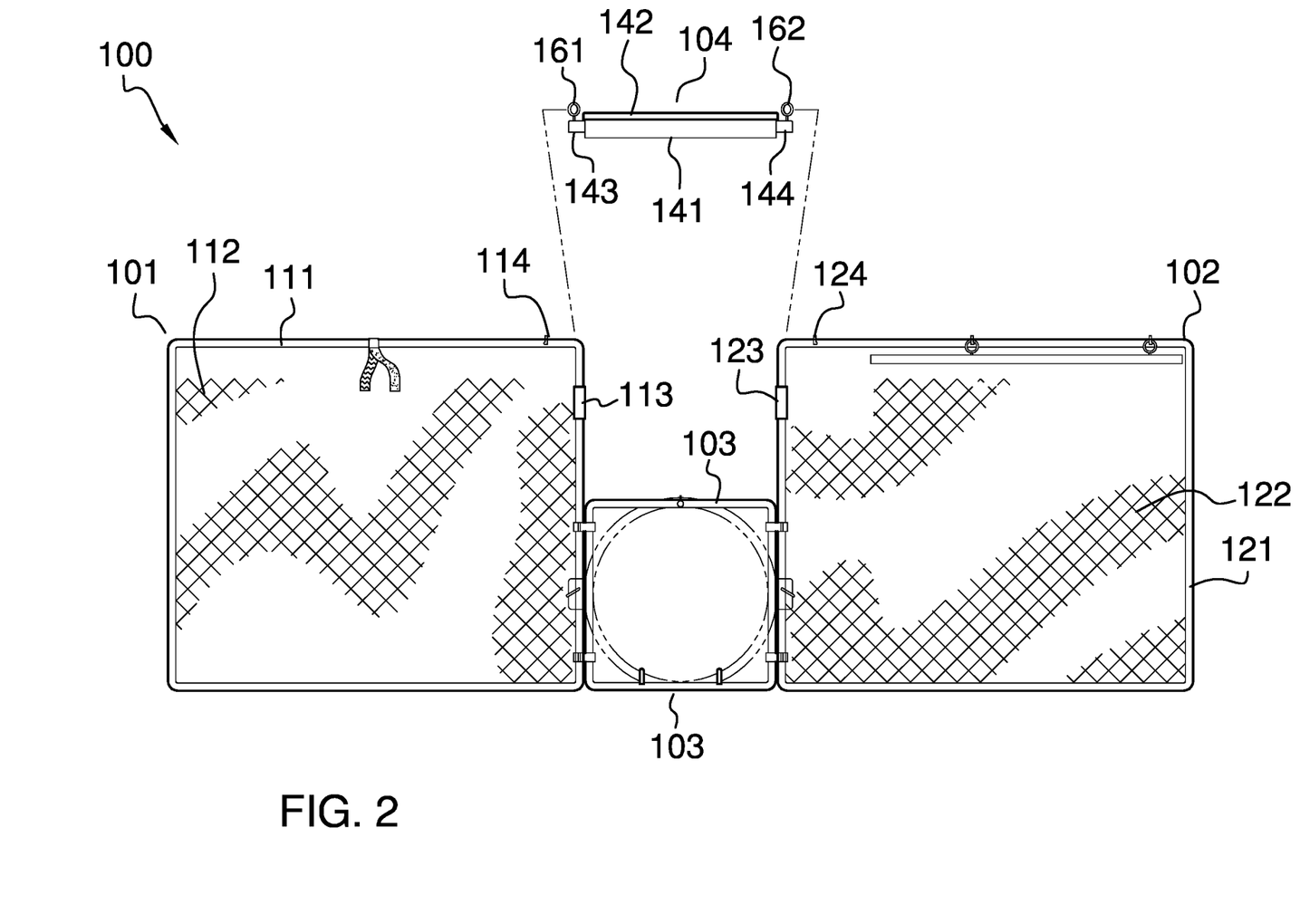
FIG. 2 is a front view of an embodiment of the disclosure.
Figure 3:
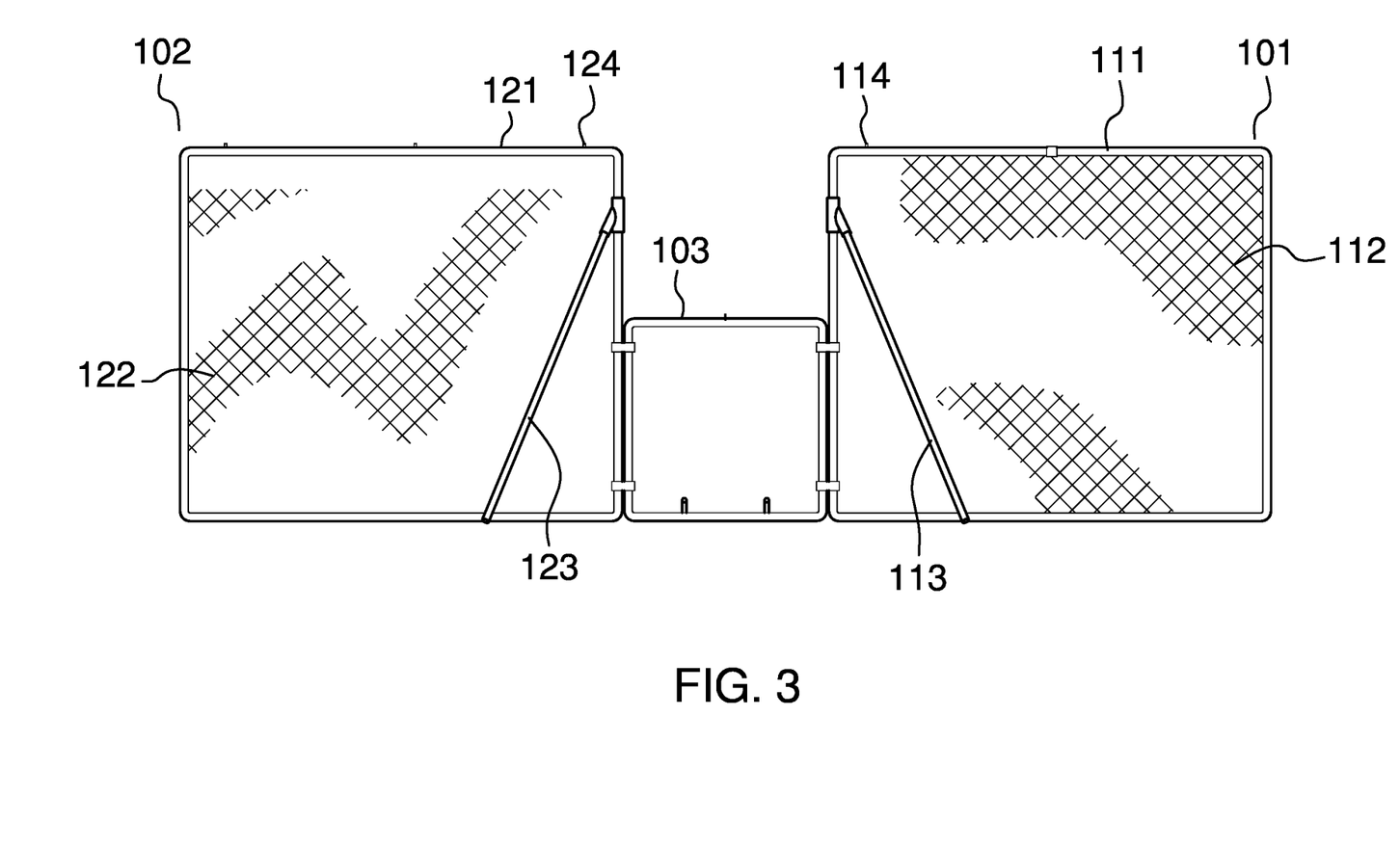
FIG. 3 is a rear view of an embodiment of the disclosure.
Figure 4:
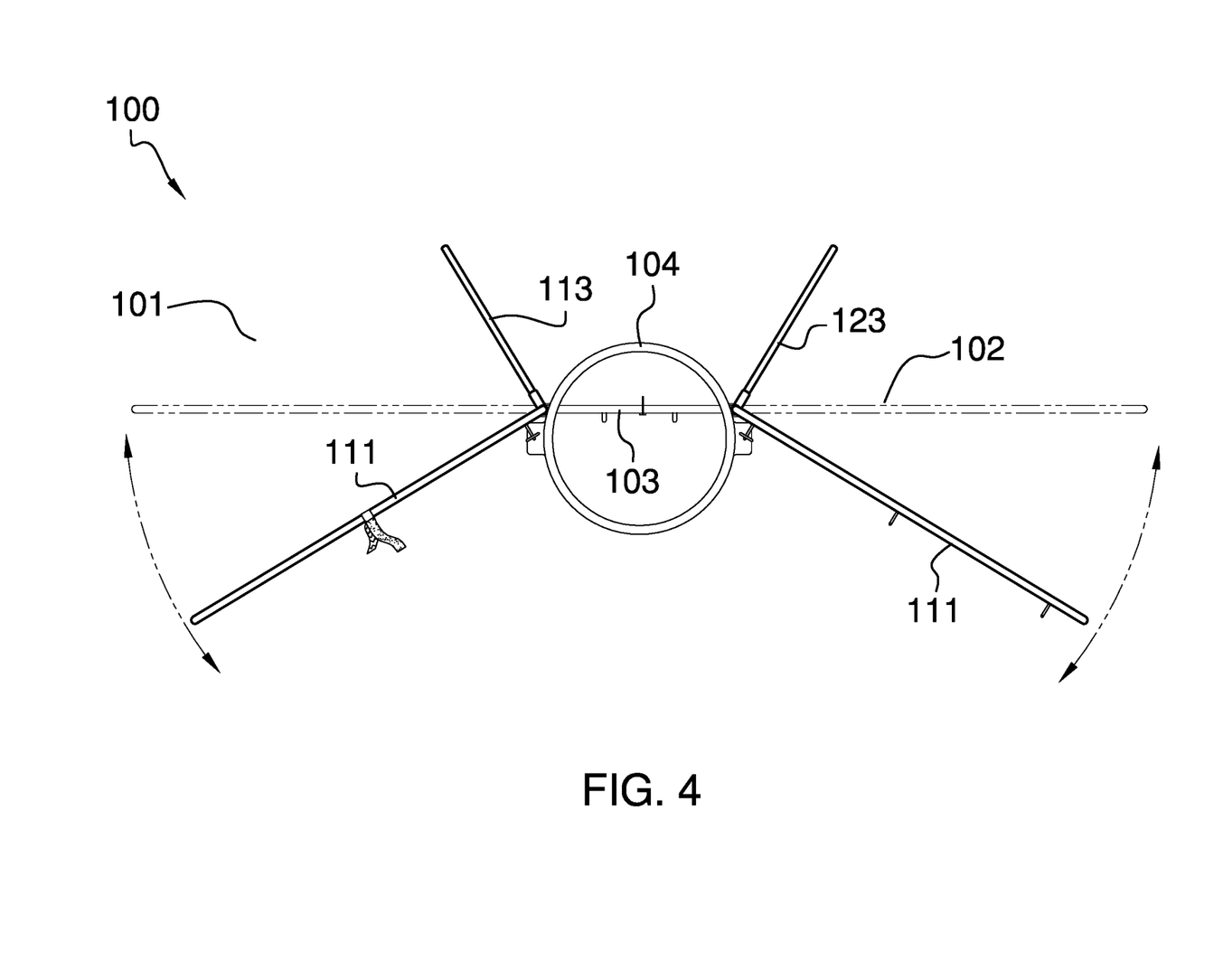
FIG. 4 is a top view of an embodiment of the disclosure.
Figure 5:
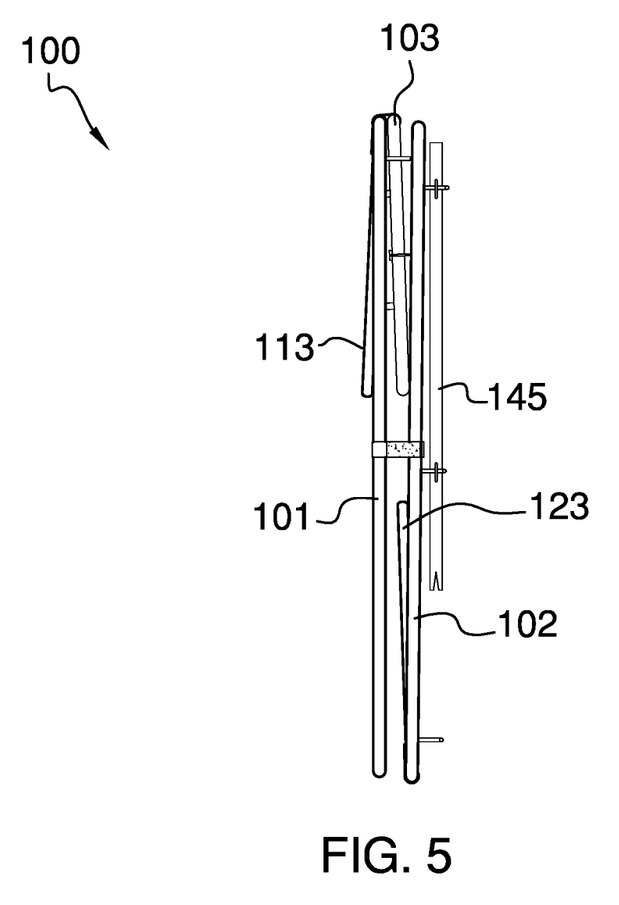
FIG. 5 is a top view of an embodiment of the disclosure.
Figure 6:
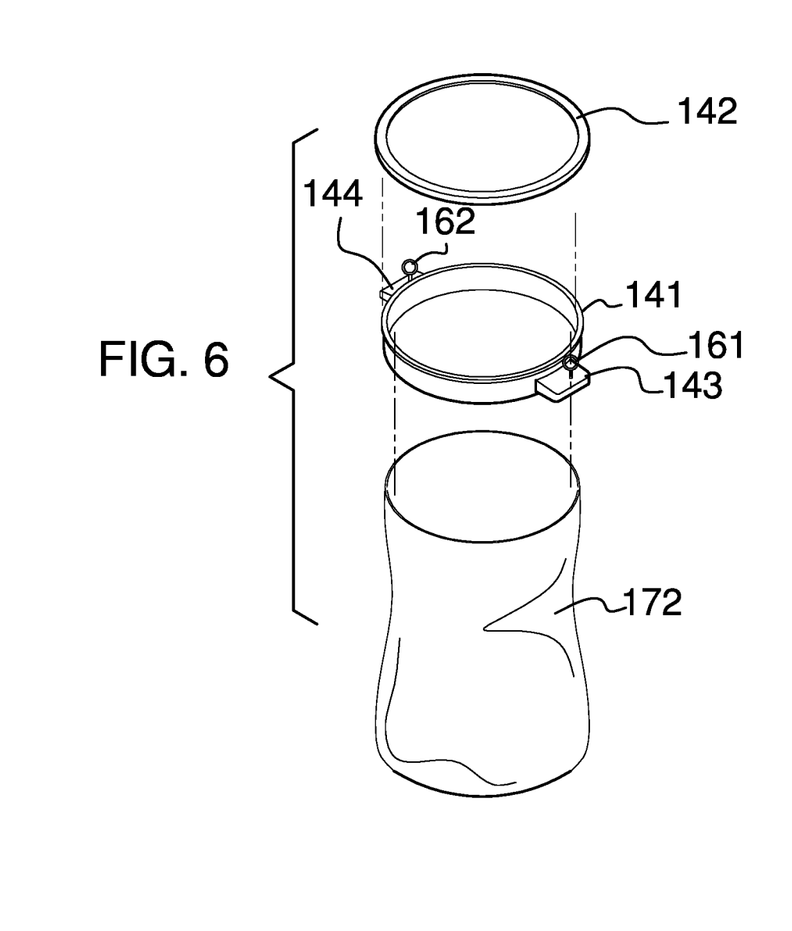
FIG. 6 is an exploded view of an embodiment of the disclosure.
Figure 7:
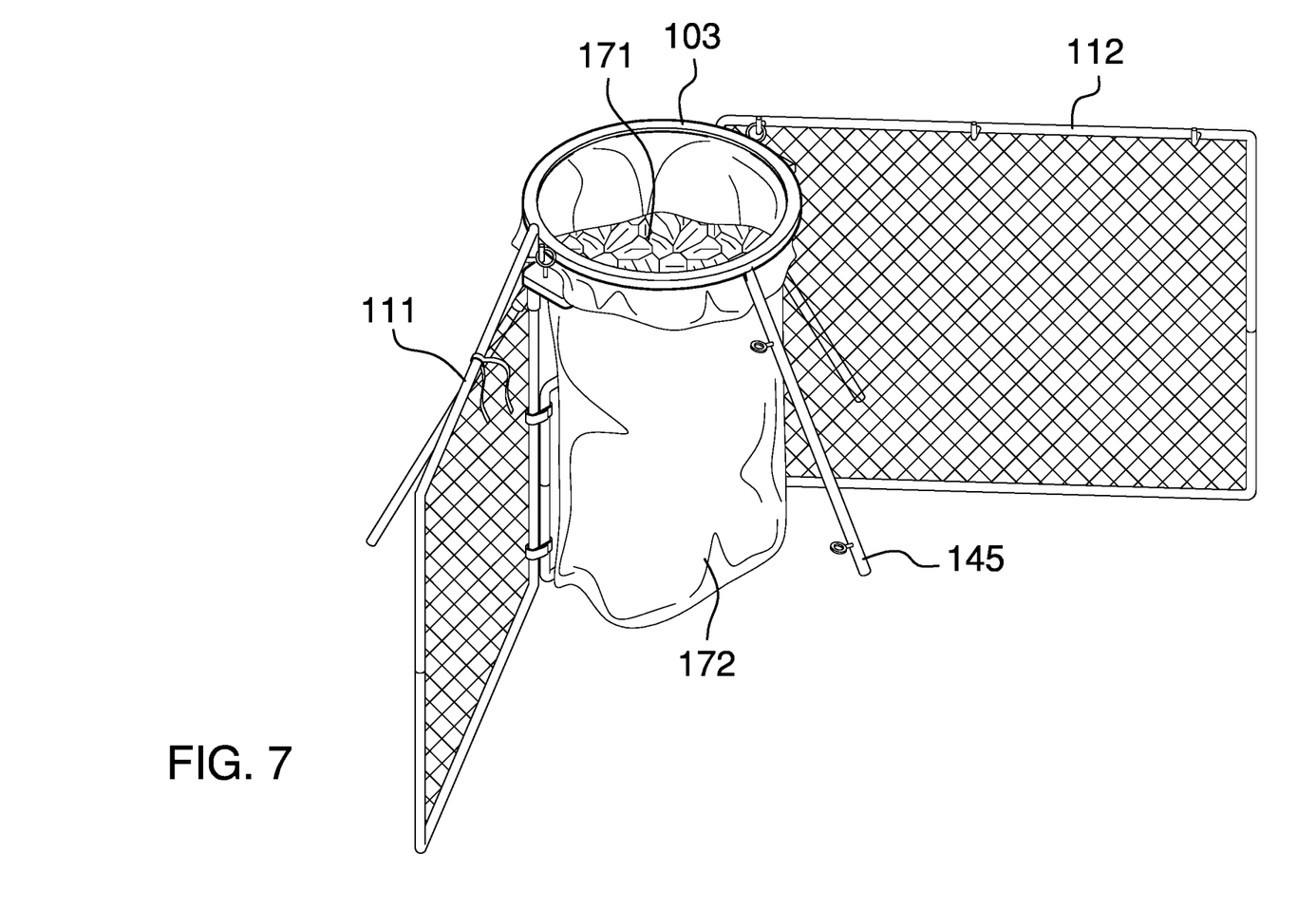
FIG. 7 is an in-use view of an embodiment of the disclosure.

Detailed reference will now be made to one or more potential embodiments of the disclosure, which are illustrated in FIGS. 1 through 7.

The lawn debris collection device 100 (hereinafter invention) is configured for use in the collection of debris 171 from the ground. The invention 100 is a screened structure that forms a barrier that captures debris 171 as it is blown by the wind. The invention 100 is configured for use with a trash bag 172. The invention 100 is a self-standing structure. The invention 100 holds the trash bag 172 in an open position during the collection of the debris 171. Specifically, the debris 171 is moved to the upwind side of the invention 100 where the debris 171 remains trapped until the debris 171 is placed in the trash bag 172. The invention 100 folds flat when not in use. The debris 171 is defined elsewhere in this disclosure. The trash bag 172 is defined elsewhere in this disclosure.

The invention 100 comprises a first side support 101, a second side support 102, a center support 103, and an elevated ring structure 104. The center support 103 and the elevated ring structure 104 attach the first side support 101 to the second side support 102. Both the center support 103 and the elevated ring structure 104 are configured to hold a trash bag 172 in the open position. The first side support 101, the second side support 102, the center support 103, and the elevated ring structure 104 are disk-shaped structures that stack such that the invention 100 can be stored as a disk-shaped structure.

The first side support 101 is a screen barrier. The first side support 101 captures debris 171 that is positioned upwind of the first side support 101. The first side support 101 contains the debris 171 while the debris 171 is transferred to a trash bag 172. The first side support 101 forms a portion of the load path that elevates the elevated ring structure 104 above the ground. The first side support 101 comprises a first rectangular frame 111, a first screen 112, a first leg 113, and a first ring hook 114.

The first rectangular frame 111 is a rectangular disk-shaped structure. The first rectangular frame 111 is an openwork structure. The first rectangular frame 111 forms a ring. The first rectangular frame 111 forms a rectangular perimeter on which the first screen 112 mounts.

The first screen 112 is a textile mesh structure. The first screen 112 mounts on the first rectangular frame 111 such that the first screen 112 covers the rectangular aperture formed by the first rectangular frame 111. The first screen 112 captures any debris 171 from the upwind side of the first screen 112 that is blown by the wind into the first rectangular frame 111. The use of a mesh structure to form the first screen 112 is well-known and documented in the textile arts.

The first leg 113 is a prism-shaped shaft structure. The first leg 113 attaches to the first rectangular frame 111 such that the first leg 113 rotates relative to the first rectangular frame 111. The first leg 113 attaches to the first rectangular frame 111 such that the position of the first leg 113 is on the down wind side of the first rectangular frame 111. The first leg 113 forms a stanchion that transfers a portion of the load path of the first rectangular frame 111 and the elevated ring structure 104 to the ground. The first leg 113 rotates such that the first leg 113 lays within the first rectangular frame 111 to maintain the disk structure of the first rectangular frame 111.

The first ring hook 114 is a hook that attaches to the first rectangular frame 111. The first ring hook 114 attaches the elevated ring structure 104 to the first rectangular frame 111.

The second side support 102 is a screen barrier. The second side support 102 captures debris 171 that is positioned upwind of the second side support 102. The second side support 102 contains the debris 171 while the debris 171 is transferred to a trash bag 172. The second side support 102 forms a portion of the load path that elevates the elevated ring structure 104 above the ground. The second side support 102 comprises a second rectangular frame 121, a second screen 122, a second leg 123, and a second ring hook 124.

The second rectangular frame 121 is a rectangular disk-shaped structure. The second rectangular frame 121 is an openwork structure. The second rectangular frame 121 forms a ring. The second rectangular frame 121 forms a rectangular perimeter on which the second screen 122 mounts.

The second screen 122 is a textile mesh structure. The second screen 122 mounts on the second rectangular frame 121 such that the second screen 122 covers the rectangular aperture formed by the second rectangular frame 121. The second screen 122 captures any debris 171 from the upwind side of the second screen 122 that is blown by the wind into the second rectangular frame 121. The use of a mesh structure to form the second screen 122 is well-known and documented in the textile arts.

The second leg 123 is a prism-shaped shaft structure. The second leg 123 attaches to the second rectangular frame 121 such that the second leg 123 rotates relative to the second rectangular frame 121. The second leg 123 attaches to the second rectangular frame 121 such that the position of the second leg 123 is on the down wind side of the second rectangular frame 121. The second leg 123 forms a stanchion that transfers a portion of the load path of the second rectangular frame 121 and the elevated ring structure 104 to the ground. The second leg 123 rotates such that the second leg 123 lays within the second rectangular frame 121 to maintain the disk structure of the first side support 101.

The second ring hook 124 is a hook that attaches to the second rectangular frame 121. The second ring hook 124 attaches the elevated ring structure 104 to the second rectangular frame 121.

The center support 103 is an openwork structure. The center support 103 attaches the first side support 101 to the second side support 102. The center support 103 is configured to receive a trash bag 172. The center support 103 holds the trash bag 172 in an open position such that the trash bag 172 can receive debris 171 from a horizontal direction. The center support 103 comprises a third rectangular frame 131 and a plurality of fasteners 132.

The third rectangular frame 131 is a rectangular disk-shaped structure. The third rectangular frame 131 is an openwork structure. The third rectangular frame 131 forms a ring. The third rectangular frame 131 forms a rectangular perimeter on which the trash bag 172 attaches such that the trash bag 172 is held in an open position. The third rectangular frame 131 holds the trash bag 172 in an orientation that allows the trash bag 172 to receive debris 171 from a horizontal direction.

Each of the plurality of fasteners 132 is a fastening device. Each of the plurality of fasteners 132 is identical. Each of the plurality of fasteners 132 attaches the third rectangular frame 131 to a frame selected from the group consisting of the first rectangular frame 111 and the second rectangular frame 121. In the first potential embodiment of the disclosure, each of the plurality of fasteners 132 is a hook and loop fastener. The hook and loop fastener is defined elsewhere in this disclosure. The plurality of fasteners 132 comprises a first fastener 151, a second fastener 152, a third fastener 153, and a fourth fastener 154.

The first fastener 151 removably attaches the third rectangular frame 131 to the first rectangular frame 111. The second fastener 152 removably attaches the third rectangular frame 131 to the first rectangular frame 111. The third fastener 153 removably attaches the third rectangular frame 131 to the second rectangular frame 121. The fourth fastener 154 removably attaches the third rectangular frame 131 to the second rectangular frame 121.

The elevated ring structure 104 is an openwork structure. The elevated ring structure 104 attaches to both the first side support 101 and the second side support 102. The elevated ring structure 104 is not required to maintain the ability of the invention 100 to remain self-standing. The elevated ring structure 104 is configured to receive a trash bag 172. The elevated ring structure 104 holds the trash bag 172 in an open position such that the trash bag 172 can receive debris 171 from a vertical direction.

The elevated ring structure 104 comprises a master ring 141, a lid ring 142, a first grip 143, a second grip 144, a third leg 145, and a leg hook 146.

The master ring 141 is a disk-shaped structure. The master ring 141 is a ring-shaped structure. The master ring 141 has a cylindrical shape. The master ring 141 removably attaches to both the first rectangular frame 111 and the second rectangular frame 121. The first rectangular frame 111 and the second rectangular frame 121 suspend the master ring 141 above the third rectangular frame 131. The master ring 141 suspends the trash bag 172 above the third rectangular frame 131 such that the trash bag 172 receives debris 171 from the vertical direction.

The lid ring 142 is a disk-shaped structure. The lid ring 142 is a ring-shaped structure. The lid ring 142 has a cylindrical shape. The inner diameter of the lid ring 142 is greater than the outer diameter of the master ring 141 such that the lid ring 142 fits over the master ring 141. The inner diameter of the lid ring 142 is greater than the outer diameter of the master ring 141 such that the trash bag 172 rests between the lid ring 142 and the master ring 141 while being loaded with debris 171.

The first grip 143 is a metal plate that attaches to the inferior surface of the master ring 141 such that the first grip 143 forms a handle used to carry the master ring 141. The first grip 143 further comprises a first eyebolt 161. The first eyebolt 161 is an eyebolt that attaches to the first grip 143. The first ring hook 114 removably attaches to the first eyebolt 161 such that the first ring hook 114 removably attaches the master ring 141 to the first rectangular frame 111.

The second grip 144 is a metal plate that attaches to the inferior surface of the master ring 141 such that the second grip 144 forms a handle used to carry the master ring 141. The second grip 144 further comprises a second eyebolt 162. The second eyebolt 162 is an eyebolt that attaches to the second grip 144. The second ring hook 124 removably attaches to the second eyebolt 162 such that the second ring hook 124 removably attaches the master ring 141 to the second rectangular frame 121.

The third leg 145 is a prism-shaped shaft structure. The third leg 145 attaches to the master ring 141 such that the third leg 145 rotates relative to the master ring 141. The third leg 145 forms a stanchion that transfers a portion of the load path of the master ring 141 to the ground. The third leg 145 removably attaches to the master ring 141. The size of the third leg 145 is such that the third leg 145 will lay within the disk structure of the first rectangular frame 111 for storage.

The third leg 145 further comprises a third eyebolt 163. The third eyebolt 163 is an eyebolt that attaches to the third leg 145. The third leg 145 removably attaches to the third eyebolt 163 such that the third leg 145 removably attaches the master ring 141 to the third leg 145. The leg hook 146 is a hook that attaches to the master ring 141. The third eyebolt 163 of the third leg 145 attaches to the leg hook 146.

The following definitions were used in this disclosure:

Bag: As used in this disclosure, a bag is a container made of a flexible material. The bag has a single opening which allows the bag to receive the items to be contained.

Closed Position: As used in this disclosure, a closed position refers to a movable barrier structure that is in an orientation that prevents passage through a port or an aperture. The closed position is often referred to as an object being "closed."

Debris: As used in this disclosure, debris refers to an accumulation of loose and unwanted material on a surface.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Eyebolt: As used in this disclosure, an eyebolt is a bolt that is formed with a ring at one end. The ring is commonly referred to as an eyelet.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Frame: As used in this disclosure, a frame is a structure: a) to which an object attaches; and, b) which forms a portion of the load path of the object.

Ground: As used in this disclosure, the ground is a solid supporting surface formed by the Earth. The term level ground means that the supporting surface formed by the ground is roughly perpendicular to the force of gravity.

Hang: As used in this disclosure, to hang an object is to suspend an object above a surface from above such that the inferior end of the object does not form a significant portion of the load path of the object.

Hook: As used in this disclosure, a hook is an object that is curved or bent at an angle such that items can be hung on or caught by the object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Inferior: As used in this disclosure, the term inferior refers to a directional reference that is parallel to and in the same direction as the force of gravity when an object is positioned or used normally.

Inner Diameter: As used in this disclosure, the term inner diameter is used in the same way that a plumber would refer to the inner diameter of a pipe.

Lawn: As used in this disclosure, a lawn refers to a field that grows grass.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Open Position: As used in this disclosure, an open position refers to a movable barrier structure that is in an orientation that allows passage through a port or an aperture. The open position is often referred to as an object being "open."

Openwork: As used in this disclosure, the term open work is used to describe a structure, often a surface, which is formed with one or more openings that allow for visibility and fluid flow through the structure. Wrought work and meshes are forms of openwork.

Orientation: As used in this disclosure, orientation refers to the positioning of a first object relative to: 1) a second object; or, 2) a fixed position, location, or direction.

Outer Diameter: As used in this disclosure, the term outer diameter is used in the same way that a plumber would refer to the outer diameter of a pipe.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Ring: As used in this disclosure, a ring is a term that is used to describe a disk-like structure through which an aperture is formed. Rings are often considered loops.

Screen: As used in this disclosure, a screen is a meshed structure made of wire, yarn, or cloth that allows for the free flow of air but prevents larger objects from passing through the meshed structure.

Shaft: As used in this disclosure, a shaft is a long, narrow and rigid prism structure that is used as: 1) a structural element of a larger object; or 2) as a grip or lever for a handle. Shafts often have a cylindrical shape.

Sheeting: As used in this disclosure, a sheeting is a material, such as a paper, textile, a plastic, or a metal foil, in the form of a thin flexible layer or layers.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Textile: As used in this disclosure, a textile is a material that is woven, knitted, braided or felted. Synonyms in common usage for this definition include fabric and cloth.

Trash Bag: As used in this disclosure, a trash bag is a disposable bag formed from a sheeting that is used to contain trash and other refuse for in a manner suitable for disposal. Trash bags are often used to line a waste container.

Wind: As used in this disclosure, wind refers to the movement of atmospheric gases in a single direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A collection device comprising
a first side support, a second side support, a center support, and an elevated ring structure;
wherein the center support and the elevated ring structure attach the first side support to the second side support;
wherein the collection device is configured for use in the collection of debris;
wherein the collection device is a screened structure;
wherein the collection device forms a barrier that captures debris as it is blown by the wind;
wherein the collection device is configured for use with a trash bag;
wherein the first side support, the second side support, the center support, and the elevated ring structure are disk-shaped structures that stack such that the collection device can be stored as a disk-shaped structure;
wherein the collection device is a self-standing structure;
wherein the collection device holds the trash bag in an open position during the collection of the debris;
wherein both the center support and the elevated ring structure are configured to hold a trash bag in the open position;
wherein the first side support is a screen barrier;
wherein the first side support captures debris that is positioned upwind of the first side support;
wherein the first side support contains the debris;
wherein the first side support forms a portion of the load path that elevates the elevated ring structure;
wherein the second side support is a screen barrier;
wherein the second side support captures debris that is positioned upwind of the second side support;
wherein the second side support contains the debris;
wherein the second side support forms a portion of the load path that elevates the elevated ring structure;
wherein the center support is an openwork structure;
wherein the center support attaches the first side support to the second side support;
wherein the center support is configured to receive a trash bag;
wherein the center support holds the trash bag in an open position such that the trash bag can receive debris from a horizontal direction;
wherein the elevated ring structure is an openwork structure;
wherein the elevated ring structure attaches to both the first side support and the second side support;
wherein the elevated ring structure is not required to maintain the ability of the collection device to remain self-standing;
wherein the elevated ring structure is configured to receive a trash bag;
wherein the elevated ring structure holds the trash bag in an open position such that the trash bag can receive debris from a vertical direction;
wherein the first side support comprises a first rectangular frame, a first screen, a first leg, and a first ring hook;
wherein the first screen, the first leg and the first ring hook attach to the rectangular frame.

2. The collection device according to claim 1
wherein the first rectangular frame is a rectangular disk-shaped structure;
wherein the first rectangular frame is an openwork structure;
wherein the first rectangular frame forms a ring;
wherein the first rectangular frame forms a rectangular perimeter on which the first screen mounts.

3. The collection device according to claim 2
wherein the first screen is a textile mesh structure;
wherein the first screen mounts on the first rectangular frame such that the first screen covers the aperture formed by the first rectangular frame.

4. The collection device according to claim 3
wherein the first leg is a prism-shaped shaft structure;
wherein the first leg attaches to the first rectangular frame such that the first leg rotates relative to the first rectangular frame;
wherein the first leg attaches to the first rectangular frame such that the position of the first leg is on the down wind side of the first rectangular frame;
wherein the first leg forms a stanchion that transfers a portion of the load path of the first rectangular frame and the elevated ring structure to the ground;
wherein the first leg rotates such that the first leg lays within the first rectangular frame to maintain the disk structure of the first rectangular frame.

5. The collection device according to claim 4
wherein the first ring hook is a hook that attaches to the first rectangular frame;
wherein the first ring hook attaches the elevated ring structure to the first rectangular frame.

6. The collection device according to claim 5
wherein the second side support comprises a second rectangular frame, a second screen, a second leg, and a second ring hook;
wherein the second screen, the second leg and the second ring hook attach to the rectangular frame.

7. The collection device according to claim 6
wherein the second rectangular frame is a rectangular disk-shaped structure;
wherein the second rectangular frame is an openwork structure;
wherein the second rectangular frame forms a ring;
wherein the second rectangular frame forms a rectangular perimeter on which the second screen mounts.

8. The collection device according to claim 7
wherein the second screen is a textile mesh structure;
wherein the second screen mounts on the second rectangular frame such that the second screen covers the aperture formed by the second rectangular frame.

9. The collection device according to claim 8
wherein the second leg is a prism-shaped shaft structure;
wherein the second leg attaches to the second rectangular frame such that the second leg rotates relative to the second rectangular frame;
wherein the second leg attaches to the second rectangular frame such that the position of the second leg is on the down wind side of the second rectangular frame;
wherein the second leg forms a stanchion that transfers a portion of the load path of the second rectangular frame and the elevated ring structure to the ground;
wherein the second leg rotates such that the second leg lays within the second rectangular frame to maintain the disk structure of the second rectangular frame.

10. The collection device according to claim 9
wherein the second ring hook is a hook that attaches to the second rectangular frame;
wherein the second ring hook attaches the elevated ring structure to the second rectangular frame.

11. The collection device according to claim 10
wherein the center support comprises a third rectangular frame and a plurality of fasteners;
wherein the third rectangular frame is a rectangular disk-shaped structure;

wherein the third rectangular frame is an openwork structure;
wherein each of the plurality of fasteners is a fastening device;
wherein each of the plurality of fasteners is identical;
wherein each of the plurality of fasteners is a hook and loop fastener;
wherein the plurality of fasteners comprises a first fastener, a second fastener, a third fastener, and a fourth fastener;
wherein the first fastener removably attaches the third rectangular frame to the first rectangular frame;
wherein the second fastener removably attaches the third rectangular frame to the first rectangular frame;
wherein the third fastener removably attaches the third rectangular frame to the second rectangular frame;
wherein the fourth fastener removably attaches the third rectangular frame to the second rectangular frame;
wherein the third rectangular frame forms a ring;
wherein the third rectangular frame forms a rectangular perimeter on which the trash bag attaches such that the trash bag is held in an open position;
wherein the third rectangular frame holds the trash bag in an orientation that allows the trash bag to receive debris from a horizontal direction.

12. The collection device according to claim 11
wherein the elevated ring structure comprises a master ring, a lid ring, a first grip, a second grip, a third leg, and a leg hook;
wherein the master ring is a disk-shaped structure;
wherein the master ring is a ring-shaped structure;
wherein the master ring has a cylindrical shape;
wherein the master ring removably attaches to both the first rectangular frame and the second rectangular frame;
wherein the lid ring is a disk-shaped structure;
wherein the lid ring is a ring-shaped structure;
wherein the lid ring has a cylindrical shape;
wherein the first grip is a metal plate that attaches to the inferior surface of the master ring such that the first grip forms a handle used to carry the master ring;
wherein the first grip further comprises a first eyebolt;
wherein the first eyebolt is an eyebolt that attaches to the first grip;
wherein the second grip is a metal plate that attaches to the inferior surface of the master ring such that the second grip forms a handle used to carry the master ring;
wherein the second grip further comprises a second eyebolt;
wherein the second eyebolt is an eyebolt that attaches to the second grip;
wherein the third leg is a prism-shaped shaft structure;
wherein the third leg attaches to the master ring such that the third leg rotates relative to the master ring;
wherein the third leg forms a stanchion that transfers a portion of the load path of the master ring to the ground;
wherein the size of the third leg is such that the third leg will lay within the disk structure of the first rectangular frame for storage.

13. The collection device according to claim 12
wherein the first rectangular frame and the second rectangular frame suspend the master ring above the third rectangular frame;
wherein the master ring suspends the trash bag above the third rectangular frame such that the trash bag receives debris from the vertical direction;
wherein the inner diameter of the lid ring is greater than the outer diameter of the master ring such that the lid ring fits over the master ring;
wherein the inner diameter of the lid ring is greater than the outer diameter of the master ring such that the trash bag rests between the lid ring and the master ring while being loaded with debris;
wherein the first ring hook removably attaches to the first eyebolt such that the first ring hook removably attaches the master ring to the first rectangular frame;
wherein the second ring hook removably attaches to the second eyebolt such that the second ring hook removably attaches the master ring to the second rectangular frame;
wherein the third leg removably attaches to the master ring;
wherein the third leg further comprises a third eyebolt;
wherein the third eyebolt is an eyebolt that attaches to the third leg;
wherein the third leg removably attaches to the third eyebolt such that the third leg removably attaches the master ring to the third leg;
wherein the leg hook is a hook that attaches to the master ring;
wherein the third eyebolt of the third leg attaches to the leg hook.

* * * * *